United States Patent [19]

Peterson, Jr. et al.

[11] Patent Number: 4,974,711
[45] Date of Patent: Dec. 4, 1990

[54] BRAKE AND CLUTCH CONTROL

[75] Inventors: Rudolph A. Peterson, Jr., Horicon; Barry M. Hough, West Bend; Dale R. Dobberpuhl, Horicon, all of Wis.

[73] Assignee: Deere & Company, Moline, Ill.

[21] Appl. No.: 387,188

[22] Filed: Jul. 31, 1989

[51] Int. Cl.⁵ .............................. B60K 41/24
[52] U.S. Cl. .................. 192/12 D; 192/13 A; 192/84 R; 192/143; 364/426.01
[58] Field of Search ............... 192/12 R, 12 D, 13 R, 192/13 A, 84 R, 1.2, 1.43; 180/273, 272; 188/109; 364/426.01

[56] References Cited

U.S. PATENT DOCUMENTS

| | | | |
|---|---|---|---|
| 4,176,735 | 12/1979 | Cousin et al. | 192/12 D |
| 4,445,603 | 3/1984 | Filsinger | 192/1.2 |
| 4,607,199 | 8/1986 | Krueger et al. | 180/273 |
| 4,651,018 | 3/1987 | Peterson, Jr. | 180/273 |
| 4,664,218 | 5/1987 | Graham et al. | 180/273 |
| 4,676,353 | 6/1987 | Matsuda | 192/13 R |
| 4,811,811 | 3/1989 | Bergene | 192/13 A |

FOREIGN PATENT DOCUMENTS 2126564  4/1972  Fed. Rep. of Germany ... 192/12 D

Primary Examiner—Richard Lorence
Assistant Examiner—Andrea Pitts

[57] ABSTRACT

A clutch and brake control circuit includes first and second relays connected to an interlock circuit and to the brake and clutch coils on a vehicle. The relays are interconnected with the coils so that the clutch coil cannot be energized unless the brake coil circuit is complete. Preferably, the brake coil circuit includes a delay timer for assuring that the brake is energized for a preselected time period after the clutch coil is deenergized. The circuit is constructed such that if the clutch coil is reenergized during the time period, power to the brake coil is interrupted and the clutch coil turns on immediately without delay. Any time after the clutch coil is deenergized, a clutch switch connected to the interlock circuit and the relays must be actuated before the clutch will engage. The interlock circuit, which may include such elements as transmission, parking brake and seat switches, is fully integrated with the brake and clutch control.

26 Claims, 1 Drawing Sheet

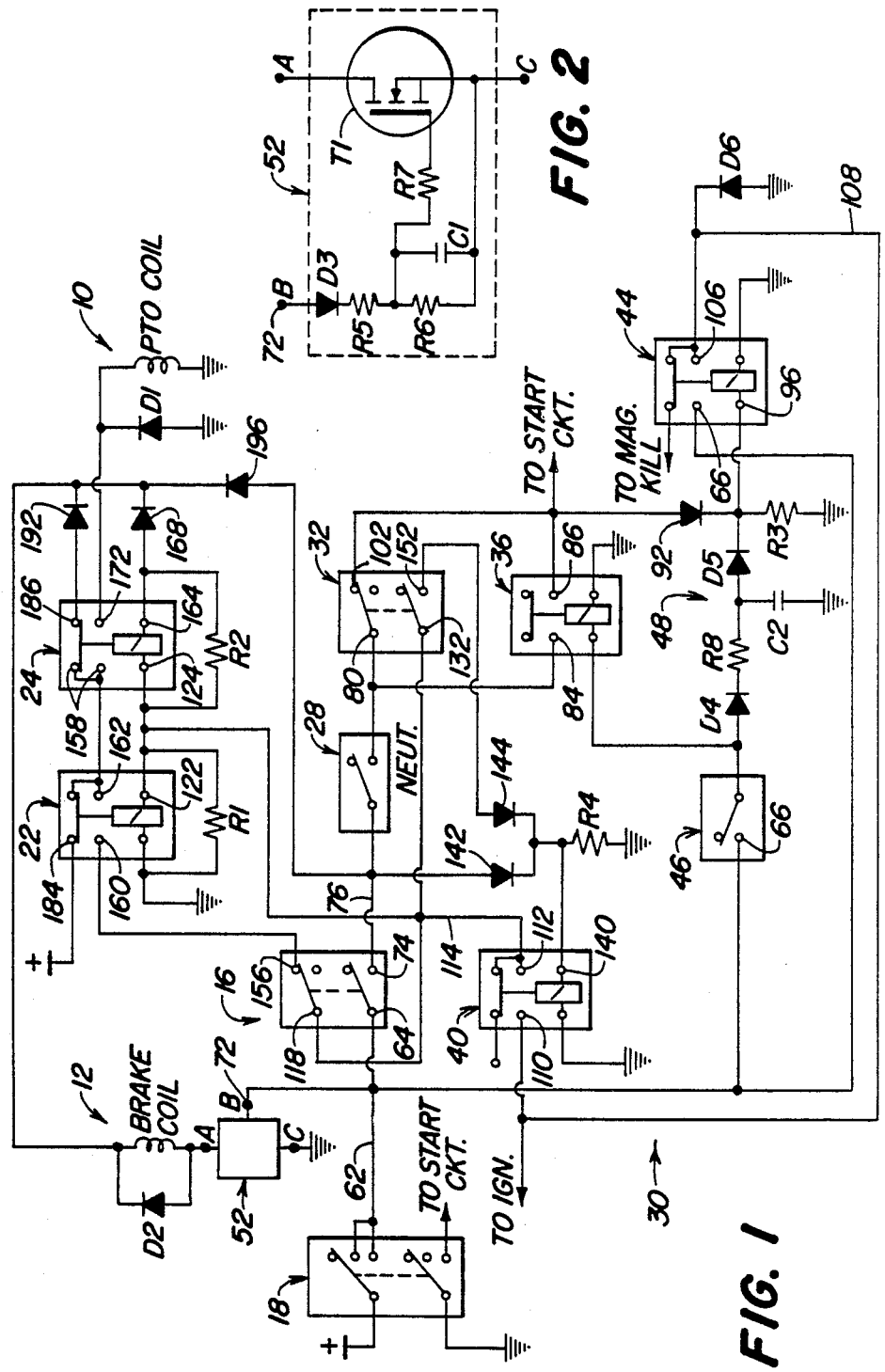

4,974,711

BRAKE AND CLUTCH CONTROL

BACKGROUND OF THE INVENTION

1. Field of the Invention

The present invention relates generally to vehicles having an electric brake and an electric clutch, and more specifically to control circuitry for controlling the electric brake and clutch and for permitting actuation of the clutch only when the brake circuit is operational.

2. Description of the Prior Art

Many types of vehicles utilize an electric clutch with an integral electric brake. For example, lawn and garden tractors and utility vehicles often include a power take off (PTO) engaged by an electric clutch to power accessories such as lawn mowers. Various fail safe systems have been employed in the past to engage a PTO brake under certain conditions. One such system included fail safe brakes with springs to automatically apply the brakes and required large clutch coils to overcome the spring pressure during normal operation of the vehicle. This type of system also required a relatively precise gap adjustment for reliable clutch operation. In systems wherein electric power must be supplied to energize the brake, continued brake operation for a period of time after de-energization of the clutch without excessive drain on the battery has been a problem.

In addition, we have heretofore been unaware of a reliable and relatively simple and economical electrical control system for a brake which senses the presence of a good brake circuit before allowing engagement of the clutch.

BRIEF SUMMARY OF THE INVENTION

It is therefore an object of the present invention to provide an improved control circuit for electrically operated brakes and/or clutches.

It is another object to provide an improved brake and clutch circuit which overcomes the aforementioned problems. It is still another object to provide such a circuit which is particularly useful with an electrically operated PTO clutch and brake on a vehicle such as a utility or lawn and garden tractor.

It is a further object of the invention to provide an improved brake and clutch control circuit for a vehicle which assures that a good brake circuit exists before allowing clutch operation. It is another object to provide such a circuit which is relatively inexpensive and simple and yet which is reliable in operation. It is yet another object to provide such a circuit which is advantageously integrated with other interlock systems on the vehicle.

It is still another object of the invention to provide an improved brake and clutch control circuit wherein activation of the clutch will only occur if the brake control is operable and the operator switches a clutch switch.

Another object of the present invention is to provide an improved brake and clutch control circuit which assures that the brake will be energized for a period of time after deenergization of the clutch. It is a further object to provide such a circuit which does not present an excessive electrical load, particularly after shutdown. It is still another object to provide such a circuit which assures that the clutch may be actuated and the brake released without delay under proper circumstances.

A clutch and brake control circuit constructed in accordance with the teachings of the present invention includes first and second relays connected to an interlock circuit and to the brake and clutch coils on a vehicle. The relays are interconnected with the coils so that the clutch coil cannot be energized unless the brake coil circuit is complete. The brake circuit includes means for engaging the brake immediately after the clutch coil is deenergized. A delay circuit is also provided for maintaining the brake in the engaged position for a preselected period of time after the vehicle ignition is turned off. After the preselected period of time, the delay automatically turns off power to the brake coil to prevent drain on the battery when the engine is not running. The circuit is constructed such that if the clutch coil is reenergized during the time period, power to the brake coil is interrupted and the clutch coil turns on immediately without delay. The interlock circuit, which may include such elements as transmission, parking brake and seat switches, is fully integrated with the brake and clutch control.

The circuit eliminates need for spring-applied fail safe brakes and large clutch coils to release the brakes, and critical gap adjustments are no longer necessary. A sensing circuit is built into the control circuit to detect a complete brake circuit before allowing engagement of the clutch. The brake circuit is energized automatically and immediately upon deenergization of the clutch circuit, regardless of whether the deenergization occurs as a result of the operator leaving the seat, turning off the clutch switch, activating the panic stop switch or turning off the ignition switch. A clutch control switch is connected between the interlock circuit and the relays and must be operated each time the clutch is to be engaged after the clutch coil has been deenergized.

These and other objects, features and advantages of the present invention will become apparent to one skilled in the art upon reading the following detailed description in view of the drawings.

BRIEF DESCRIPTION OF THE DRAWINGS

FIG. 1 is a schematic of one embodiment of the brake and clutch control circuit of the present invention.

FIG. 2 is a schematic of the delay circuit utilized in the circuit of FIG. 1.

DESCRIPTION OF THE PREFERRED EMBODIMENT.

Referring now to FIG. 1, therein is shown a circuit diagram for a vehicle having a PTO or clutch coil indicated generally at 10 for actuating a PTO clutch or other electrically operated clutch on the vehicle. The vehicle also includes an electrically operated brake structure including a brake coil indicated generally at 12. In a utility vehicle such as a front mounted mower, the clutch coil 10 is activatable to engage the drive to a mower deck or other attachment to the vehicle. The brake structure including the brake coil 12 for such a vehicle is operably associated with the PTO clutch for applying a braking force to the clutch under certain preselected conditions. Although the present invention has particular advantage as a PTO clutch-brake arrangement and will be described herein as such, it is to be understood that the present control circuit may be utilized with other types of clutch and/or brake arrangements.

As shown in FIG. 1, the brake and clutch control circuitry includes a PTO switch 16 connected between an ignition switch 18 and a controllable switch such as a disconnect relay 22. The disconnect relay 22 is connected to a sensing switch or relay 24 which in turn is connected to the clutch coil 10 and the brake coil 12. A transmission switch 28, which is part of an interlock circuit indicated generally at 30, has an input connected to one output of the PTO switch 16 and an output connected to an input of a parking brake switch 32. The output of the transmission switch 28 is also connected an input of a seat relay 36, the output of which is connected to a Start Circuit and to one of the outputs of the parking brake switch 32. A PTO relay 40 has an output connected to control inputs on the relays 22 and 24, and an input lead connected to an output of an ignition relay 44. A seat switch 46 includes an input connected to the ignition switch 18 and an output connected to the seat relay 36 and, through a delay circuit 48, to the ignition relay 44.

The brake coil 12 is connected between a break delay circuit 52 and the sensing relay 24. As will be described in detail later, the clutch cannot be activated by the coil 10 unless the portion of the circuit including the brake coil 12 and the break delay 52 are connected and operable. The break delay 52 (shown in detail in FIG. 2) assures that the brake coil 12 is activated to engage the brake for a preselected time period after the ignition is turned off. After the preselected period of time, the break delay 52 cuts off current flow through the brake coil 12 to prevent drain on the vehicle battery during shut-down.

The circuit of FIG. 1 will now be described in further detail. The ignition switch 18 is a double pole, double throw switch having "OFF", "RUN" and "START" positions, and shown in the "OFF" position in FIG. 1. The "RUN" and "START" terminals are connected to a line 62 which in turn is connected to an input 64 on the PTO switch 16, to an input 66 on the seat switch 46, and to an input terminal 66 on the ignition relay 44. The line 62 is also connected to control input 72 of the delay 52.

The PTO switch 16, shown in the "ON" position in FIG. 1, includes a lower output terminal 74 connected by a line 76 to the input of the transmission switch 28 which is open as shown in FIG. 1 at all times except when the transmission is in neutral. When the switch 28 is closed, a connection is established between the line 76 and an input 80 of the double pole, double throw parking brake switch 32. The output of the transmission switch 28 is also connected to an input terminal 84 of the seat relay 36. The corresponding output terminal 86 is connected to a conventional Start Circuit (not shown) and, through a diode 92, to the control input 96 of the ignition relay 44. The parking brake switch 32, shown in the position it assumes when the parking brake is engaged, includes an upper output terminal 102 which is also connected to the Start Circuit and to the seat relay output terminal 86. The Start Circuit is grounded through the lower terminal of the ignition switch 18 when the ignition switch is moved to the "START" position.

As is evident from FIG. 1, the PTO switch must be in the "OFF" position and the transmission switch 28 must be closed by positioning the transmission in neutral to energize the Start Circuit. In addition, either the seat switch 46 must be closed to energize the relay 36 and provide a path between the terminals 84 and 86, or the parking brake switch must be in the "ON" position before the Start Circuit can be activated. The solenoid of the ignition relay 44 is activated when power is supplied to the control terminal 96 either through the diode 92 from the terminal 86 or 102, or through the delay circuit 48 and the seat switch 46 when the seat switch is closed by the positioning of the operator in the proper location on the vehicle. When the ignition relay 44 is activated, the input terminal 66 is connected to a corresponding output terminal 106 to provide a path from the ignition switch line 62 to a line 108 leading to the ignition circuit on the vehicle. It should be noted here that the relays of FIG. 1 are shown in the positions which they assume when no power is applied to the control inputs of the solenoids. When power is applied to the control inputs, the solenoids are activated to move the switch contacts down from the positions shown. When no power is applied to the control terminal 96 of the ignition relay 44, a magneto-kill connection is made to stop the engine on the vehicle.

The line 108 connected to the output terminal 106 of the ignition relay 44 is also connected to an input terminal 110 on the PTO relay 40. The corresponding output terminal 112 is connected via line 114 to upper input terminal 118 of the PTO switch 16. The output terminal 112 is also connected to control terminals 122 and 124 of the disconnect and sensing relays 22 and 24, respectively. The PTO relay output terminal 112 is also connected to the lower input terminal 132 of the parking brake switch 32. The PTO relay 40 includes a control input 140 connected through blocking diodes 142 and 144 to the PTO switch output terminal 74 and to a lower output terminal 152 of the parking brake switch 32, respectively. Therefore, the PTO relay 40 is activated to provide a path between the terminals 110 and 112 when the PTO switch 16 is moved into the "OFF" position with power applied to the line 62 through the ignition switch 18. Once the PTO switch 16 is moved to "OFF" to connect terminals 64 and 74 and the ignition relay 44 is activated to provide power to the ignition, the PTO relay may be latched in the activated position by moving the parking brake switch to the "OFF" position wherein power will be provided from the terminal 112 through the parking brake switch 32 and the diode 144 to the control input 140. The PTO switch 16 may then be moved to the "ON" position shown in FIG. 1 without removing power from the control input 140.

When power is applied to the control input 140 as described above, the relay 40 will close and current will flow through the solenoid of the relay 22 via the line 114 and the input terminal 122. The relay 22 will then be activated to connect output terminal 156 of the PTO switch 16 to input terminals 158 of the sensing relay 24 via terminals 160 and 162. The sensing relay 24 includes a second solenoid terminal 164 which is connected through a blocking diode 168 to the brake coil 12; therefore, the sensing relay 24 can be activated to connect the PTO coil with the PTO switch 16 only if a good circuit is provided through the brake coil 12 and the delay 52. If there is a fault in either the brake coil or the delay, no current can flow through the solenoid of the sensing relay 24 since these elements are connected in series with each other, and no power can be applied to the PTO coil 10 to engage the clutch. If the brake coil and delay circuit are in tact and power is applied to the terminal 124 of the sensing relay 24, the relay will close to connect the terminal 156 of the PTO switch to the PTO coil via output terminal 172 on the relay 24. With the relays 22 and 24 activated, and with the PTO switch 16 in the "ON" position shown in FIG. 1, the PTO coil 10 will be activated to engage the clutch.

The disconnect relay 22 includes an upper input terminal 184 connected directly to the electrical source on the vehicle. When the relays 22 and 24 are deactivated as shown in FIG. 1, the terminal 184 is connected to terminal 186 on the relay 24 via output terminal 188 and terminal 158. The terminal 186 is connected through a blocking diode 192 to the coil 12. Therefore, when the relays 22 and 24 are in the condition shown in FIG. 1, a current path is provided from the source to the coil 12 to engage the brake, provided the coil is grounded through the break delay 52.

The solenoid activation current for the relay 24 is substantially smaller than the current necessary through the brake coil 12 to engage the brake, and therefore brake engagement can only occur when the sensing relay is in the condition shown in FIG. 1 (i.e., no current flowing through the solenoid of the relay 24), or when the PTO switch 16 is switched to the "OFF" position wherein a current path is provided from the switch output terminal 74 through a blocking diode 196 to the brake coil 12.

Resistors R1–R4 are connected in parallel with the relay solenoid coils to increase the current draw of the circuit so that moisture or the like will not lead to extraneous currents that will trigger the relays. Preferably, the resistors are each approximately 470 ohms. To eliminate large voltage spikes upon turning off power to the coils 10 and 12, diodes D1 and D2 are connected in parallel with the respective coils.

The delay 52 selectively connects the base end of the brake coil 12 to ground during normal operation and for a preselected period of time after the ignition switch is turned to "OFF". Whenever the ignition switch is moved from the "OFF" position to the "RUN" or "START" position, the terminal 72 goes positive and causes the base end of the coil 12 to be connected to ground so that the brake may be engaged. Turning the ignition switch to "OFF" causes the terminal 72 to return to zero potential, but an RC delay (see R6, C1 of FIG. 2) maintains the gate (T1) on to clamp the coil 12 to ground for preferably about ten seconds after shutdown so that the brake will be engaged during that time. After the voltage across capacitor C1 decays to a level below the turn-on voltage of the gate T1, the current path to ground from terminal A to terminal C is interrupted to avoid drain on the vehicle battery. R5 has a substantially smaller resistance than R6, and with C1 defines a very short time constant so that the base end of the brake coil 12 is connected to ground almost immediately when the ignition is turned on. The following components have been found to provide good delay action:

R5... 100 Ohms
R6... 100K Ohms
R7... 51 Ohms
C1... 100 MFD
T1... MTP3055A MOSFET The seat delay circuit 48 includes a capacitor C2 connected to the output terminal of the seat switch 46 through a diode D4 and a resistor R8. The capacitor C2 is connected through a diode D5 to the control terminal 96 of the ignition relay 44. Normally when the driver leaves his seat without first turning off the PTO switch 16, moving the transmission into neutral and setting the parking brake, the relay 44 will immediately turn off to kill the engine. At the same time the relay 40 will drop out and the PTO will be disengaged and stopped. When this happens, the operator must operate the switch 16 to reengage the relay 40 before the PTO coil 10 can be reenergized. The capacitor C2 provides a very brief time delay before the voltage at the input terminal 96 drops below that necessary to maintain the relay 44 on. The delay minimizes nuisance PTO stops resulting from the PTO relay 40 dropping out when bumps, vibrations and the like cause the seat switch 46 to open. Preferably, C2 has a capacity of approximately 2200 MFD. R8 has a resistance around 20 ohms to limit current through the switch 46 upon charging of C2. A diode D6 is also connected to the output terminal 106 of the relay 44 provide a reverse polarity magneto kill.

Operation of the Circuit

On start-up, the operator moves the PTO switch down to the "OFF" position, puts the transmission in neutral and either engages the parking brake to turn on the switch 32 or sits in the seat to close the seat switch 46. Thereafter turning the ignition switch 18 to "ON" supplies power to the Start Circuit through the switches 16, 28 and 32 (or the relay 36) and also energizes the ignition relay 44. Moving the switch 18 to "START" completes the Start Circuit. Once the engine is running and the switch 18 is in the "RUN" position, the ignition relay 44 will remain activated to keep the engine from stopping when either the seat switch is closed or the circuit is complete from the terminal 102 of the parking brake switch 32 back through the transmission switch 28 and PTO switch 16 to the line 62 from the ignition switch 18 (i.e., the PTO switch is "OFF", the transmission is in neutral and the parking brake is set).

On start-up, the PTO relay will also be activated to provide a path between the terminals 110 and 112, so that line 114 is connected to the power source through the relay 44. The relays 22 and 24 will be activated but since the PTO switch is "OFF" and the terminal 118 is not connected to the terminal 156, the PTO coil 10 cannot be activated to engage the clutch. Turning the PTO switch 16 on without first moving the parking brake switch off will cause the PTO relay 40 to drop out so that relays 22 and 24 are no longer activated to supply power to the PTO coil 10. However, once the parking brake is released with the PTO relay 40 activated, a current path to the control input 140 is provided from the line 114 through the switch 32 and diode 144 to bootstrap the relay 40 on. It should be clear that in the event the PTO relay 40 is deactivated for any reason, it can only be reactivated by first moving the PTO switch 16 down to the "OFF" position to supply current through the terminals 64 and 74 and the diode 142 to the control input 140. This feature prevent energization of the PTO coil 10 and activation of the clutch before the operator moves the PTO switch.

With the PTO relay 40 latched on to energize the control inputs 122 and 124 of the relays 22 and 24, a current path will be established through the coil from the PTO switch output terminal 156, provided the brake coil 12 and delay 52 are operable so that a current path to ground is established from the terminal 164 of the solenoid for relay 24. Moving the switch 16 to "ON" then energizes the PTO coil 10 to engage the clutch. If there is a fault in the brake coil 12 or delay 52 which interrupts the path to ground from the terminal 164, the relay 24 will not energize to turn on the clutch.

If the PTO switch 16 is turned "OFF", power to the coil 10 will be interrupted to disengage the clutch. At the same time, contact will be established between terminals 64 and 74 of the switch 16 to provide a current path from the power source through the diode 196 to the brake coil 12. Since the input at the control terminal 72 of the delay 52 is high, the delay 52 completes the circuit through the coil 12 to ground to cause the brake to engage. The brake will remain engaged for the preselected period of time, determined by the time constant of the delay 52, after the ignition switch 18 is turned to "OFF".

Having described the preferred embodiment, it will become apparent to one skilled in the art that various modifications may be made while not departing from the scope of the invention as defined in the claims which follow.

We claim:

1. In a vehicle having a source of electrical current, and an electrically engageable clutch and an electrically engageable brake, brake and clutch control circuitry comprising:
   an activatable clutch control circuit;
   an activatable brake control circuit;
   means for continuously monitoring the condition of the brake control circuit and providing an indication of a fault in the brake control circuit that would render the brake control inoperative to engage the brake; and
   means responsive to the indication of a fault in the brake control circuit for preventing activation of the clutch control circuit and thereby preventing engagement of the clutch when a fault is indicated in the brake control circuit.

2. The invention as set forth in claim 1 further including means for automatically activating the brake control circuit to engage the brake for at least a preselected period of time after the clutch is disengaged.

3. The invention as set forth in claim 2 including a main control switch for selectively connecting and disconnecting the clutch control circuit to the source, and delay circuit means responsive to the disconnecting of the clutch control circuit for activating the brake control circuit for the preselected period.

4. The invention as set forth in claim 1 wherein the clutch control circuit includes an operator controlled switch for selecting clutch engaging and clutch nonengaging modes of operation, and lockout means for preventing reengagement of the clutch regardless of the selected mode after deactivation of the clutch control circuit without first operating the controlled switch.

5. The invention as set forth in claim 4 wherein the lockout means comprises a relay having a control input connected to the operator controlled switch.

6. In a vehicle having a source of electrical current, and an electrically engageable clutch and an electrically engageable brake, brake and clutch control circuitry comprising:
   an activatable clutch control circuit;
   an activatable brake control circuit;
   means for providing an indication of a fault in the brake control circuit;
   means responsive to the indication of a fault in the brake control circuit for preventing activation of the clutch control circuit and thereby preventing engagement of the clutch when a fault is indicated in the brake control circuit;
   wherein the brake control circuit includes a brake coil connected to a first controllable switch, and the clutch control circuit includes a clutch coil connected to a second controllable switch having a control input; and
   wherein the means for providing an indication of a fault in the brake control circuit includes means connecting the control input and the brake coil.

7. The invention as set forth in claim 6 wherein the second controllable switch comprises a relay and the means responsive to the indication includes a corresponding relay coil.

8. In a vehicle having a source of electrical current with a ground, and an electrically engageable clutch and an electrically engageable brake, brake and clutch control circuitry comprising:
   a clutch activating coil;
   a brake activating coil having first and second terminals;
   a brake actuating circuit connected to the first terminal of the brake coil;
   a clutch actuating circuit connected to the clutch coil;
   grounding means for connecting the second terminal of the brake coil to ground and providing a closed circuit between the first terminal and ground;
   means for detecting an open circuit between the first terminal and ground; and
   means responsive to the detection of an open circuit between the first terminal and ground for preventing actuation of the clutch circuit.

9. The invention as set forth in claim 8 including an delay circuit connected to the brake activating coil for activating the brake coil and engaging the brake for at least a preselected period of time after the clutch coil is deactivated.

10. The invention as set forth in claim 9 including means connecting the delay circuit and the clutch actuating circuit for additionally preventing actuation of the clutch circuit when the delay circuit is inoperable.

11. The invention as set forth in claim 8 including an operator controlled clutch switch, and vehicle interlock means responsive to at least one vehicle condition for automatically deactivating the clutch control circuit to disengage the clutch, and means for preventing reengagement of the clutch after clutch disengagement without first operating the clutch switch.

12. The invention as set forth in claim 11 wherein the interlock means comprises an activatable switch having a deactivated condition wherein the clutch is disengaged, the clutch switch has an "ON" and an "OFF" condition, wherein when the clutch switch is in the "OFF" condition activation of the clutch is prevented, and wherein the means for preventing reengagement of the clutch includes means for changing the condition of the activatable switch from deactivated to activated only when the clutch switch is in the "OFF" condition.

13. The invention as set forth in claim 8 further comprising circuit means for actuating the brake immediately after the clutch is deactivated, including means for applying voltage from the source to the first terminal when the clutch is deactivated, and wherein the grounding means includes a controllable switch, and a timing circuit for controlling the switch to open the circuit between the first terminal and ground after a preselected period of time after the clutch is deactivated.

14. In a vehicle having a source of electrical current, and an electrically engageable clutch and an electrically engageable brake, brake and clutch control circuitry comprising:
   a clutch activating coil;
   a brake activating coil;
   a brake actuating circuit connected to the brake coil;
   a clutch actuating circuit connected to the clutch coil;
   means for detecting the presence of a fault in the brake coil;
   means for preventing actuation of the clutch circuit when a fault is present in the brake coil; and
   wherein the clutch actuating circuit includes a relay having a control input and the means for preventing actuation of the clutch circuit comprises means connecting the control input and the brake activating coil.

15. The invention as set forth in claim 14 wherein the relay includes an actuating coil connected to the control input.

16. The invention as set forth in claim 15 wherein the actuating coil is connected in series with the brake coil.

17. In a vehicle having a source of electrical current, and an electrically engageable clutch and an electrically engageable brake, brake and clutch control circuitry comprising:
   a clutch activating coil;
   a brake activating coil;
   a brake actuating circuit connected to the brake coil;
   a clutch actuating circuit connected to the clutch coil;
   means for preventing actuation of the clutch circuit when a fault is present in the brake coil;
   wherein the clutch actuating circuit includes a first switch having a control input connected between the source and the brake coil and responsive to a first current through the brake coil to actuate the clutch circuit for engagement of the clutch.

18. The invention as set forth in claim 17 further including an operator controlled clutch switch connected between the source and the first switch and switchable between a first condition and a second condition for selectively connecting and disconnecting, respectively, the first switch to and from the source.

19. In a vehicle having a source of electrical current, and an electrically engageable clutch and an electrically engageable brake, brake and clutch control circuitry comprising:
   a clutch activating coil;
   a brake activating coil;
   a brake actuating circuit connected to the brake coil;
   a clutch actuating circuit connected to the clutch coil;
   means for detecting a fault in the brake actuating coil;
   means for preventing actuation of the clutch circuit when a fault is detected in the brake coil;
   circuit means for actuating the brake immediately after the clutch is deactivated; and
   wherein the means for preventing actuation of the clutch circuit is also responsive to the condition of the circuit means for additionally preventing actuation of the clutch circuit when the circuit means is inoperable to actuate the brake.

20. In a vehicle having a source of electrical power and an electrically engageable PTO clutch and an electrically operated PTO brake, a brake and clutch control including a disconnect relay connected to the brake and the clutch, engageable PTO switch means including an operator controlled switch connected between the source and the disconnect relay, means for actuating the relay and engaging the PTO clutch when the switch means is engaged, and means for automatically and immediately operating the PTO brake upon disengagement of the PTO clutch.

21. The invention as set forth in claim 20 further comprising a sensing switch connected to the brake and responsive to a fault in the brake for preventing engagement of the PTO clutch.

22. The invention as set forth in claim 21 wherein the brake includes a coil, and the sensing switch includes means for detecting the condition of the coil.

23. The invention as set forth in claim 20 further including a main switch for selectively disconnecting the source from the controlled switch, and delay means connected to the brake for actuating the brake for a preselected period of time after disconnection of the source.

24. The invention as set forth in claim 23 including means for detecting the condition of the delay means and preventing actuation of the PTO clutch upon detection of a fault in the delay means.

25. The invention as set forth in claim 20 including means for preventing, after disengagement of the PTO clutch, reengagement of the PTO clutch without first operating the controlled switch.

26. The invention as set forth in claim 20 including an engine kill circuit operable in a polarity opposite to that of the electrical source.

* * * * *